(12) United States Patent
Segato

(10) Patent No.: US 8,002,345 B2
(45) Date of Patent: Aug. 23, 2011

(54) ULTRA LIGHT SADDLE STRUCTURE, PARTICULARLY FOR PEDAL-DRIVEN VEHICLES AND PROCESS FOR MAKING ITS SUPPORT FRAME

(75) Inventor: Stefano Segato, Vicenza (IT)

(73) Assignee: Selle Royal SpA, Pozzoleone (IT)

( * ) Notice: Subject to any disclaimer, the term of this patent is extended or adjusted under 35 U.S.C. 154(b) by 156 days.

(21) Appl. No.: 12/094,165

(22) PCT Filed: Dec. 6, 2005

(86) PCT No.: PCT/IB2005/003683
§ 371 (c)(1),
(2), (4) Date: May 19, 2008

(87) PCT Pub. No.: WO2007/066165
PCT Pub. Date: Jun. 14, 2007

(65) Prior Publication Data
US 2008/0277979 A1   Nov. 13, 2008

(51) Int. Cl.
*B60N 2/38* (2006.01)
(52) U.S. Cl. .............. 297/195.1; 297/215.16; 297/214
(58) Field of Classification Search .. 297/195.1–215.16, 297/452.27
See application file for complete search history.

(56) References Cited

U.S. PATENT DOCUMENTS

| | | | | |
|---|---|---|---|---|
| 5,179,140 A | * | 1/1993 | Ariannejad | 523/440 |
| 5,203,607 A | * | 4/1993 | Landi | 297/214 |
| 5,482,351 A | * | 1/1996 | Young et al. | 297/216.2 |
| 5,544,937 A | * | 8/1996 | Hanagan | 297/215.12 |
| 6,106,059 A | * | 8/2000 | Minkow et al. | 297/202 |
| 6,116,684 A | * | 9/2000 | Williams | 297/214 |
| 6,244,655 B1 | * | 6/2001 | Minkow et al. | 297/202 |
| 6,257,662 B1 | * | 7/2001 | Yates | 297/214 |
| 6,345,865 B1 | * | 2/2002 | Ashida et al. | 297/195.1 |
| 6,942,291 B2 | * | 9/2005 | Yu | 297/200 |
| 6,976,736 B2 | * | 12/2005 | Yu | 297/215.16 |
| 7,037,865 B1 | * | 5/2006 | Kimberly | 442/181 |
| 7,159,936 B2 | * | 1/2007 | Bigolin | 297/214 |
| 7,192,085 B2 | * | 3/2007 | Lee | 297/195.1 |
| 7,674,512 B2 | * | 3/2010 | Marson et al. | 428/116 |
| 2001/0008053 A1 | * | 7/2001 | Belli | 36/28 |
| 2001/0022356 A1 | * | 9/2001 | Kubotera et al. | 252/511 |
| 2002/0125749 A1 | * | 9/2002 | Ashida et al. | 297/195.1 |
| 2003/0164629 A1 | | 9/2003 | Bigolin | |
| 2004/0090096 A1 | * | 5/2004 | Bigolin | 297/214 |
| 2006/0269738 A1 | * | 11/2006 | Kimberly | 428/323 |
| 2007/0126269 A1 | * | 6/2007 | Chipkar | 297/195.1 |

FOREIGN PATENT DOCUMENTS

EP   0516592   12/1992

(Continued)

*Primary Examiner* — Laurie K Cranmer
(74) *Attorney, Agent, or Firm* — Themis Law

(57) ABSTRACT

An ultra light multilayer saddle structure, particularly for pedal-driven vehicles, includes a support frame optionally covered with a resilient padding. The frame has a first skin and a second skin, between which a spacer core is interposed. The first and the second skin include at least one layer of a first material and one layer of a second material respectively, selected among those having a predetermined density and a relatively high compressive and shear strength. The core has at least one layer of a third material whose density is lower than that of the first and second materials. The core is adapted to keep the skins spaced-apart, to increase the stiffness and mechanical strength of the frame, while reducing the overall weight thereof. A process for making a frame for the saddle structure is provided.

20 Claims, 3 Drawing Sheets

FOREIGN PATENT DOCUMENTS

| | | |
|---|---|---|
| FR | 2783195 | 3/2000 |
| GB | 1121123 | 7/1968 |
| JP | 56024141 | 3/1981 |
| JP | 03271087 | 12/1991 |
| JP | 03271087 A * | 12/1991 |

* cited by examiner

ULTRA LIGHT SADDLE STRUCTURE, PARTICULARLY FOR PEDAL-DRIVEN VEHICLES AND PROCESS FOR MAKING ITS SUPPORT FRAME

FIELD OF THE INVENTION

This invention generally finds application in the art of pedal-driven vehicles, and particularly relates to an ultra light saddle structure.

The invention further relates to a process for making such a structure.

BACKGROUND OF THE INVENTION

In the art of pedal-driven vehicles, the need has been long felt of saddle structures which, while still being comfortable and stiff, are as light as possible, to improve cycling performances.

As it is known, a saddle structure essentially comprises a rigid support body, generally known as "shell", a padding laid thereon, and means for securing the assembly to the frame of the bicycle, typically including one or more specially shaped bars attached to the seat post by clamps.

The shell component is particularly stressed when riding the vehicle, and must therefore have high mechanical strength properties. Nevertheless, it must also be flexible, to maintain its comfort and be able to absorb the vibrations which are forcibly associated to riding.

Traditionally, shells were made of metal or wood, which caused them to have a heavy weight and poor flexibility.

Then, with the advent of polymers, shells began to be manufactured from polymer-based materials, which had a definitely lighter weight and a higher flexibility.

A drawback of such prior art shells is that, while polymers have a light weight, they are by their nature rather flexible and have a low bending and compressive strength.

In recent times, low density materials have been increasingly used in industry, namely carbon, glass, kevlar® fiber reinforced polymers or the like, or particle- or metal-nanoreinforced polymers, e.g. nanoreinforced with titanium, aluminum, magnesium.

To achieve an acceptable stiffness, these prior art structures are composed of various superimposed layers. This configuration is critical, because these materials are by their nature rather flexible and the superposition of multiple layers is the only arrangement that can afford a stiff and strong structure.

As it is known, the bending strength of a rigid body is a function of the moment of inertia, which is a maximum when the section areas are at the greatest distance from the neutral axis.

From European Patent EP-B1-1305209 by the applicant hereof, a saddle of the above type is known, which has a plurality of first superimposed layers, secured to one or more layers having a different conformation.

While this solution provides a stiff saddle having a rather lightweight construction, it still has a few apparent drawbacks.

First, the above mentioned materials have a rather high cost, and this results in an unavoidable increase in the final price of the product.

Furthermore, even when low density materials are used, the superposition of multiple layers somewhat increases the weight of the shell, thereby impairing cycling performances.

SUMMARY OF THE INVENTION

The object of this invention is to overcome the above drawbacks, by providing a saddle structure that achieves high efficiency and has a relatively simple construction.

A particular object is to provide a lightweight shell structure which also has an adequate mechanical strength.

A further object is to provide a shell structure that is both cost-effective and functional.

Yet another object of the invention is to provide a simple, easily-reproducible process for making a saddle structure.

These objects, as well as others that will be apparent hereafter, are fulfilled by providing an ultra-light saddle structure which comprises a support frame optionally covered with a resilient padding, characterized in that said frame has a first skin and a second skin with a spacer core interposed therebetween, wherein each of said first and second skins includes at least one layer of a first material and one layer of a second material respectively, selected among those having a predetermined density and a relatively high compressive and shear strength, and wherein said core has at least one layer of a third material whose density is lower than that of said first and second materials.

Thanks to this particular configuration, the saddle structure of the invention has good stiffness properties as well as an adequate tensile, compressive, torsional and bending strength, while having a very light overall weight.

In accordance with a further aspect of the invention, a process is proposed for making a support frame for an ultra-light saddle structure as described hereinbefore, characterized in that it comprises the following steps: providing a first skin having at least one layer of a first material of predetermined density and relatively high mechanical strength; providing a second skin having at least one layer of a second material of predetermined density and relatively high mechanical strength; providing an intermediate core, having at least one layer of a third material whose density is lower than those of said first and second materials; providing a mold having an internal cavity of a predetermined shape, corresponding to the external shape of a support frame for a saddle structure; opening said mold and depositing said first skin thereon; laying said intermediate core on said first skin; laying said second skin on said core; hermetically closing said mold and heating it to a predetermined operating temperature; cooling said mold to a final predetermined temperature; opening said mold and removing the finished support frame.

BRIEF DESCRIPTION OF THE DRAWINGS

Further features and advantages of the invention will be more apparent from the detailed description of a preferred, non-exclusive embodiment of a saddle structure according to the invention, which is described as a non-limiting example with the help of the annexed drawings, in which.

DETAILED DESCRIPTION OF A PREFERRED EMBODIMENT

Figure 1:
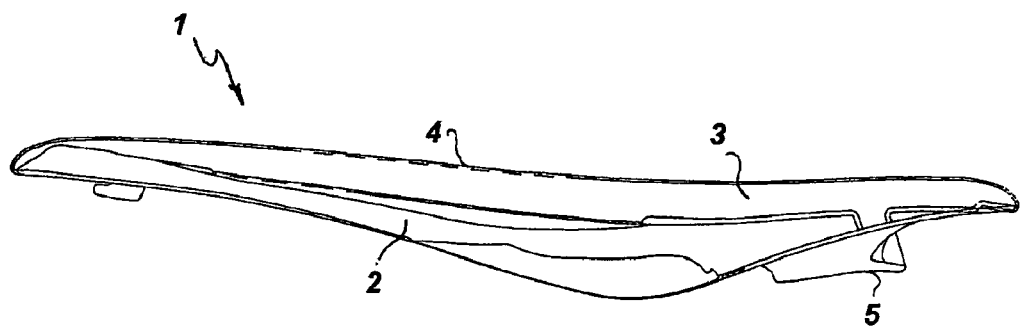
FIG. 1 is a side view of the saddle structure according to the invention.
Figure 2:
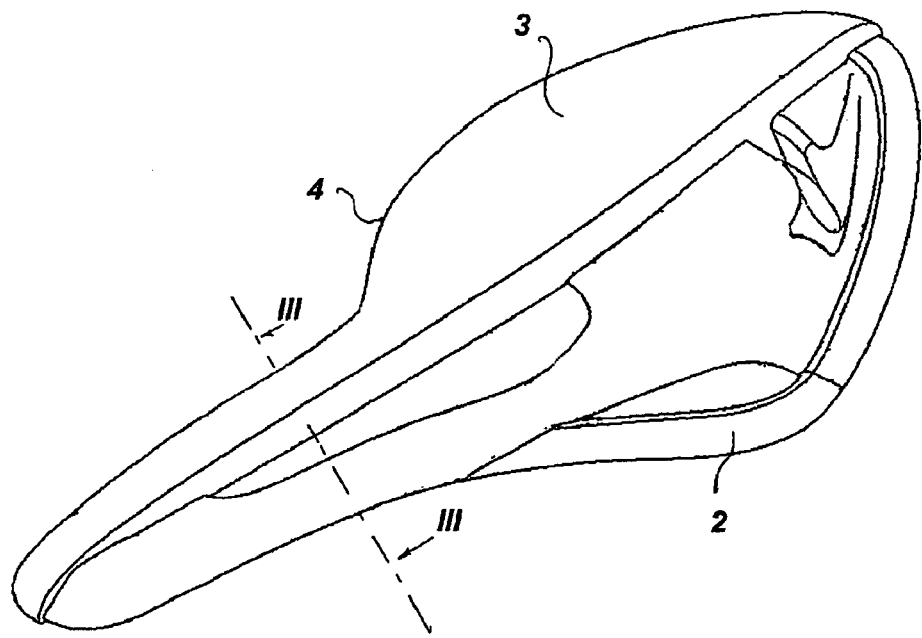
FIG. 2 is an axonometric view of the support frame included in the structure according to the invention.
Figure 3:
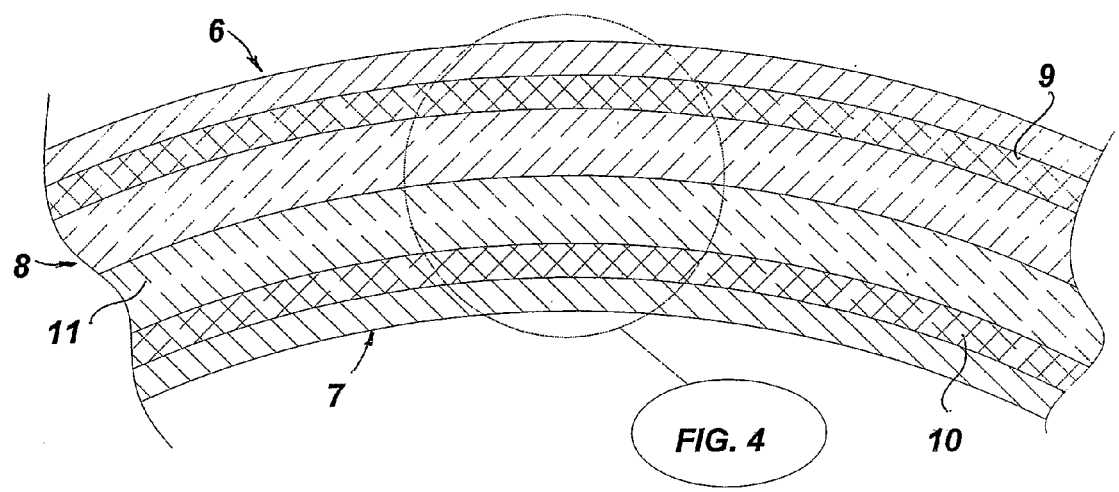
FIG. 3 is a view of the frame included in the structure of the invention, as taken along a plane III-III.
Figure 4:
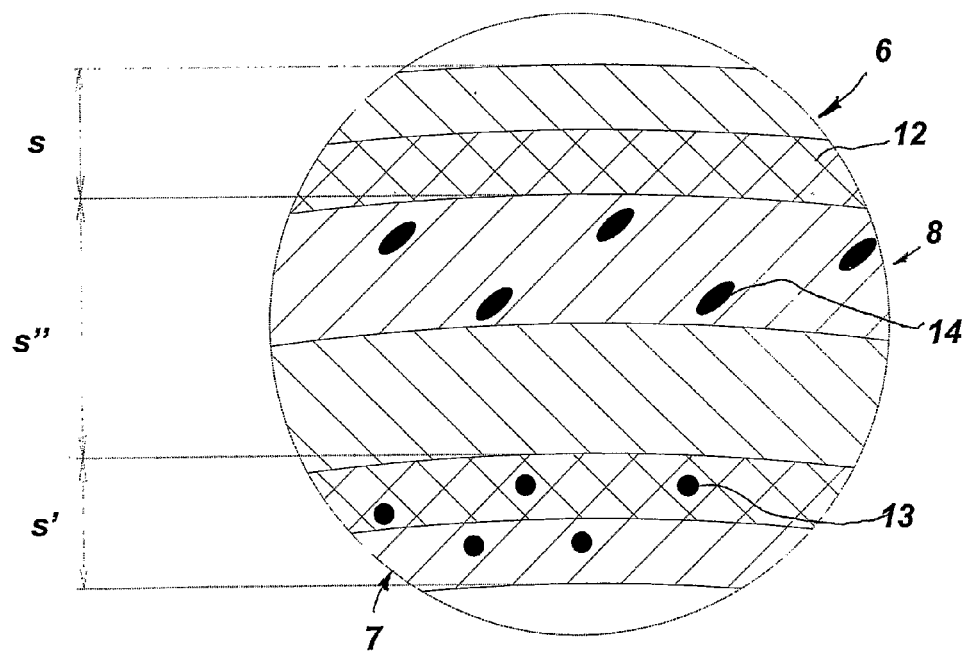
FIG. 4 is an enlarged view of a detail of FIG. 3.
Figure 5:
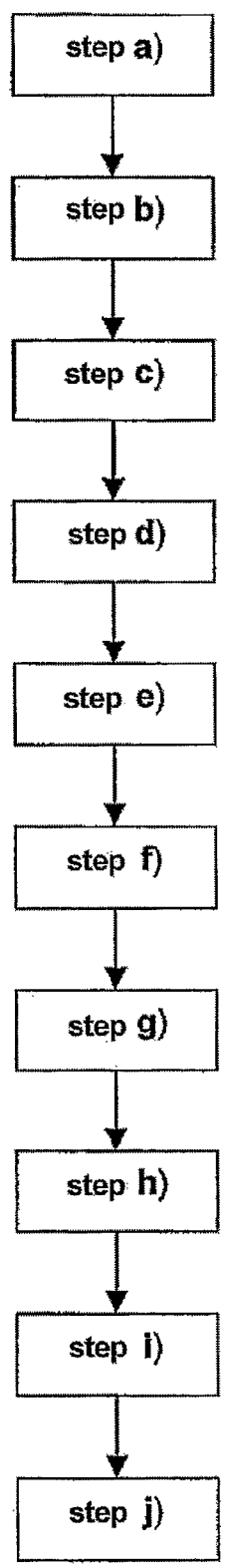
FIG. 5 is a diagram summarizing a process for making a support frame for an ultra lightweight saddle structure according to the invention.

Referring to the above figures, the structure of the invention, generally designated by numeral 1, comprises a support frame 2, optionally covered with a padding 3 of resilient material, such as an elastomer, a gel or a combination thereof.

A cover layer 4 will be preferably laid on the padding 3 or directly on the frame 2 if no padding is provided, which layer may be made of imitation leather, lycra® or anyway of a soft synthetic or natural material.

Suitably, the structure 1 may have means 5 for connecting the frame 2 to a pedal-driven vehicle, such as a bicycle, a tricycle or the like. For instance, these means 5 may consist of a housing having a cavity for connection to a fork which connects the saddle to the seat post of a bicycle, which fork is known per se and is not shown.

According to the invention, the frame 2 has a first skin 6 and a second skin 7, between which a spacer core 8 is interposed.

The first skin 6 and the second skin 7 have in turn at least one layer 9 of a first material, and one layer 10 of a second material, which are selected among those having a predetermined density and a relatively high compressive and shear strength.

The core 8 has at least one layer 11 of a third material, whose density is lower than that of the first and second materials which form at least partly the first skin 6 and the second skin 7 respectively.

It shall be intended that both the skins 6 and 7 and the core 8 may be composed of multiple superimposed layers of the same material or of different materials, and that the two skins 6 and 7 themselves may be made from different materials respectively.

According to the invention, the core 8 is adapted to keep the skins 6 and 7 spaced-apart, to increase the stiffness and mechanical strength of the frame 2, while reducing the overall weight thereof.

To this end, each of the first and second materials may be a composite or metal material, whereas the third material may be substantially porous, so that its density may be minimized.

This configuration will provide a stiff and lightweight assembly. The skins 6 and 7 do not have a high strength in themselves, even when they lay over each other like in currently available saddles.

Therefore, such skins 6, 7 may be selected of a very little thickness, to limit the overall weight of the assembly. Particularly, the thickness of the composite skins may be of 0,1 mm to 1 mm, and is preferably of about 0,4 mm, whereas the thickness of metal skins may be of 0,05 mm to 1 mm, and is preferably of about 0,2 mm. Thanks to such sizes, the use of these materials may be minimized. This would affect per se the strength of the assembly.

However, by keeping the two skins 6 and 7 at a sufficient distance, through the use of a very lightweight core 8, a frame may be obtained which has a limited weight but has a much higher mechanical strength than any structure simply composed of the two superimposed skins.

For the skins 6 and 7 to be effectively spaced apart, while limiting the overall weight of the structure, the thickness of the core 8 may be of 1 mm to 10 mm, and is preferably of 5 mm.

This configuration has the definite advantage of affording, in addition to a light weight, a considerable cost reduction, thanks to the minimized use of the costly materials that form the first and second skins.

Conveniently, the third material may have a foam, honeycomb or lattice-like structure. Thus, while the core 8 has a very light weight, it can resist compressive and shear stresses acting on the frame 2 during normal cycling.

The foam or honeycomb structure may be of the polymer-based type, with the polymer being preferably selected from epoxy resins, PVC, polyurethane or the like, or of the metal-based type, with the metal being preferably selected from titanium, aluminum foam or the like.

The lattice-like structure may include fibers of a material selected from carbon, kevlar®, glass, metal or the like.

In accordance with another embodiment, the porous material may be a natural material, such as balsa or the like, or a synthetic, polymer material.

Advantageously, the first skin 6 and/or the second skin 7 may have reinforcing particles 12 or fibers 13. The fibers 13 will preferably be carbon, Kevlar® or metal fibers, whereas the particles 12 will be glass or polymer particles, to afford a stronger structure.

As mentioned above, the materials that form the first skin 6 and the second skin 7 may be metal or polymer materials, optionally reinforced.

Suitably, such metal material may be selected from titanium, aluminum, stainless steel, magnesium or the like.

Composite materials may advantageously comprise a fibrous matrix, preferably selected from the carbon fibers, glass fibers or the like, and a thermoplastic or thermosetting resin.

The thermoplastic resin may be selected from polyamide, polypropylene, polybutyl terephthalate, polystyrene or the like, whereas the thermosetting resin may be selected from phenolic, epoxy, vinyl ester resins or the like.

For the assembly to be reinforced and have an increased strength, the core 8 may contain reinforcing particles 14, for example nanometer- or micrometer-sized particles.

A process for making a support frame for an ultra lightweight saddle structure according to the invention, as described above, includes the following steps.

The first step a) consists in providing a first skin 6 having at least one layer of a first material of predetermined density and relatively high mechanical strength. The next step b) consists in providing a second skin 7 having at least one layer of a second material of predetermined density and relatively high mechanical strength. The next step c) consists in providing an intermediate core 8 having at last one layer of a third material, whose density is lower than those of said first and second materials.

Then, in step d) a mold is provided, which has an internal cavity of a predetermined shape, corresponding to the external shape of a support frame 2 for a saddle structure, and in the next step e), the mold is opened and the first skin 6 is deposited therein, and overlaid, in the next steps f) and g) respectively, with the intermediate core 8 and, the second skin 7, the latter over the former.

Then, a step h) in which the mold is hermetically closed and heated to a predetermined operating temperature, which may be of 50° C. to 350° C., and will preferably be of about 120° C., will be followed by a step i) in which the mold is cooled to a predetermined final temperature, for instance ambient temperature.

The last step is stel j), in which the mold is opened and the finished support frame 2 is removed therefrom.

Advantageously, the skins 6 and 7 may be impregnated, while being deposited in the mold or at an earlier time, with a resin, preferably of the thermoplastic or thermosetting type.

Suitably, the skins 6 and 7 may be attached to the core 8 by using resin or adhesive.

In this case, the predetermined operating temperature may be close to the glass transition temperature of said resin.

From the foregoing, the structure of the invention proves to fulfill the proposed objects and particularly meets the requirement of having both an adequate mechanical strength and a light weight.

The use of the above multilayer material affords a saddle structure with a good mechanical strength, by only using two light and thin skins, made of a material with a relatively high mechanical strength. A simple superposition of these skins, with no spacer core therebetween, would provide a much less stiff and strong assembly.

The saddle structure of this invention is susceptible of a number of changes and variants, within the inventive concept disclosed in the appended claims. All the details thereof may be replaced by other technically equivalent parts, and the materials may vary depending on different needs, without departure from the scope of the invention.

While the saddle structure has been described with particular reference to the accompanying figures, the numerals referred to in the disclosure and claims are only used for the sake of a better intelligibility of the invention and shall not be intended to limit the claimed scope in any manner.

The invention claimed is:

1. An ultra-light multilayer saddle structure for a bicycle comprising:
   a support frame of a bicycle saddle optionally covered by a resilient padding, said support frame comprising a tapered front portion extending into a widened rear portion and further comprising a first skin, a second skin and a spacer core interposed therebetween; and
   a cover layer laid over said padding or directly on said frame,
   wherein each of said first skin and second skin includes at least one layer of a first material and one layer of a second material having a predetermined density and compressive and shear strengths,
   wherein said core has at least one layer of a third material having a density lower than the density of said first and second materials, and
   wherein said first material and said second material comprise a metal or a composite material containing reinforcing particles or fibers, said third material being a substantially porous material, said core having a thickness higher than both said first skin and said second skins so to keep the skins spaced apart and increase stiffness and mechanical strength of said frame while maintaining an overall weight lower than a predetermined amount.

2. The saddle structure as claimed in claim 1, wherein said substantially porous material has a foam, honeycomb, or lattice structure.

3. The saddle structure as claimed in claim 2, wherein said substantially porous material having a foam or honeycomb structure is a polymer- or metal-based material.

4. The saddle structure as claimed in claim 3, wherein said polymer-based material is selected from the group consisting of epoxy resins, PVC, polyurethane, or phenolic resins.

5. The saddle structure as claimed in claim 2, wherein said foam or honeycomb structure comprises titanium or aluminum.

6. The saddle structure as claimed in claim 2, wherein said lattice structure contains fibers of a material selected from the group consisting of carbon, glass, kevlar®, or metal.

7. The saddle structure as claimed in claim 1, wherein said porous material is a natural or synthetic material.

8. The saddle structure as claimed in claim 7, wherein said natural material is balsa wood.

9. The saddle structure as claimed in claim 7, wherein said synthetic material is a polymer material.

10. The saddle structure as claimed in claim 1, wherein said core contains reinforcing fibers or particles.

11. The saddle structure as claimed in claim 10, wherein said reinforcing fibers or particles are made of carbon, glass, kevlar®, or metal.

12. The saddle structure as claimed in claim 1, wherein said metal material is selected from the group consisting of titanium, aluminum, stainless steel, or magnesium.

13. The saddle structure as claimed in claim 1, wherein said composite material comprises a fibrous matrix and a thermoplastic or thermosetting resin.

14. The saddle structure as claimed in claim 13, wherein said fibrous matrix is selected from the group consisting of carbon, or glass fibers.

15. The saddle structure as claimed in claim 13, wherein said thermoplastic resin is selected from the group consisting of PA, PP, PBT, or PS.

16. The saddle structure as claimed in claim 13, wherein said thermosetting resin is selected from the group consisting of phenolic, epoxy, or vinyl ester resins.

17. The saddle structure as claimed in claim 1, wherein each of the thicknesses of said first skin and of said second skin made of a composite material is of 0.1 mm to 1 mm.

18. The saddle structure as claimed in claim 1, wherein each of the thicknesses of said first skin and of said second skin made of a metal material is of 0.05 mm to 1 mm.

19. The saddle structure as claimed in claim 1, wherein the thickness of said core is of 1 mm to 10 mm.

20. The saddle structure as claimed in claim 1, further comprising means for connecting said frame to a bicycle.

* * * * *